H. H. HUNGERFORD.
ZWIEBACK CUTTER.
APPLICATION FILED JUNE 1, 1906.

982,366.

Patented Jan. 24, 1911.

4 SHEETS—SHEET 1.

WITNESSES:
Gustave Dieterich
Edwin K. Dietrich

INVENTOR
Henry H. Hungerford
BY
Conrad Augustus Dietrich
his ATTORNEY

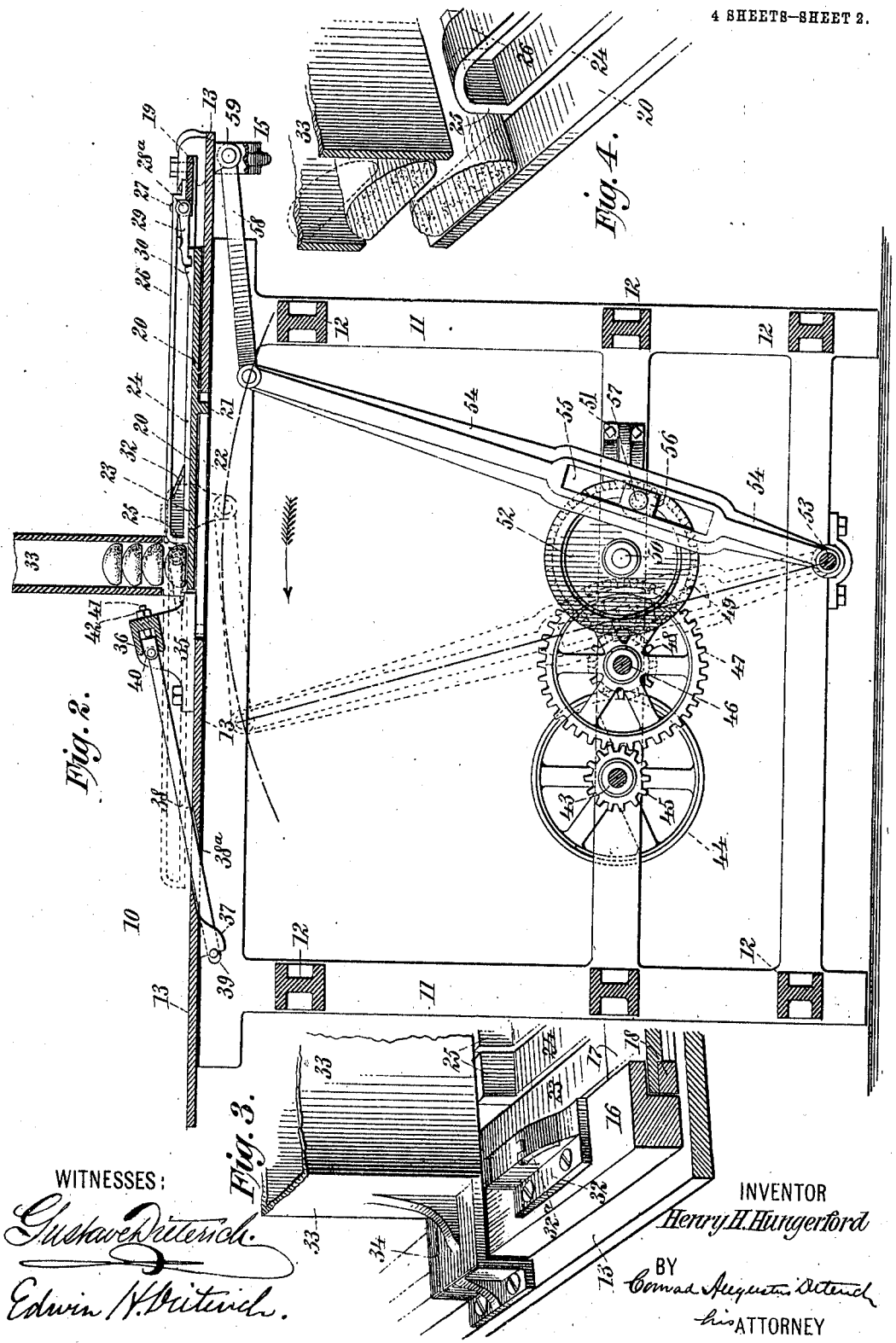

H. H. HUNGERFORD.
ZWIEBACK CUTTER.
APPLICATION FILED JUNE 1, 1906.

982,366.

Patented Jan. 24, 1911.

4 SHEETS—SHEET 3.

WITNESSES:
Gustave Dieterich
Edwin H Dieterich

INVENTOR
Henry H. Hungerford
BY
Conrad Augustus Dieterich
his ATTORNEY

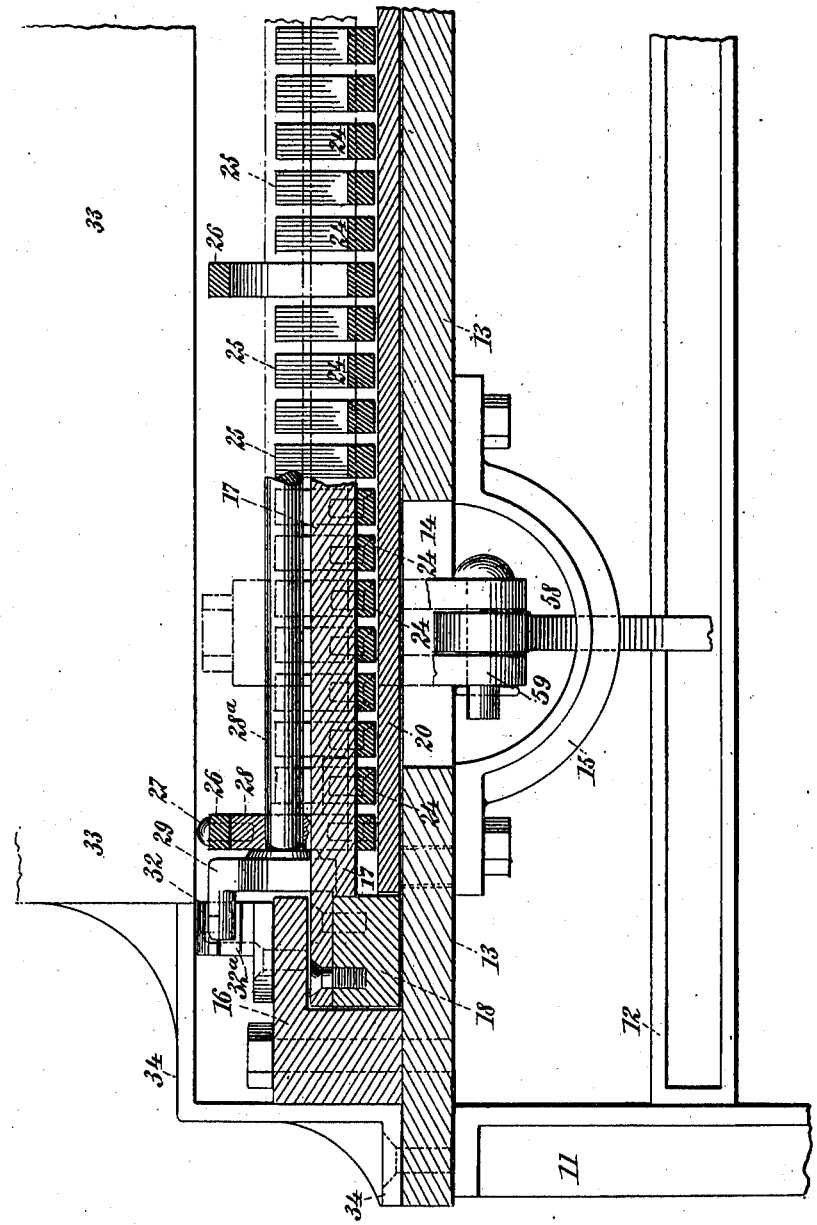

UNITED STATES PATENT OFFICE.

HENRY H. HUNGERFORD, OF CHICAGO, ILLINOIS, ASSIGNOR TO FRANK M. PETERS, OF CHICAGO, ILLINOIS.

ZWIEBACK-CUTTER.

982,366.  Specification of Letters Patent.  Patented Jan. 24, 1911.

Application filed June 1, 1906. Serial No. 319,661.

*To all whom it may concern:*

Be it known that I, HENRY H. HUNGERFORD, a citizen of the United States, residing at Chicago, Cook county, in the State of Illinois, have invented certain new and useful Improvements in Zwieback-Cutters, of which the following is a full, clear, and exact specification.

My invention relates to improvements in machinery for cutting bread and similar articles, and the same has for its object more particularly to provide a simple, efficient and reliable apparatus for quickly and simultaneously severing a complete loaf into a plurality of slices of uniform thickness, and then moving said severed sections or slices away from the cutting means in such form as to permit the same being readily removed from the machine.

To the attainment of the above mentioned objects and ends my invention consists in the novel details of construction and in the combination, connection and arrangement of parts hereinafter more fully described, and then pointed out in the claims.

Figure 1:
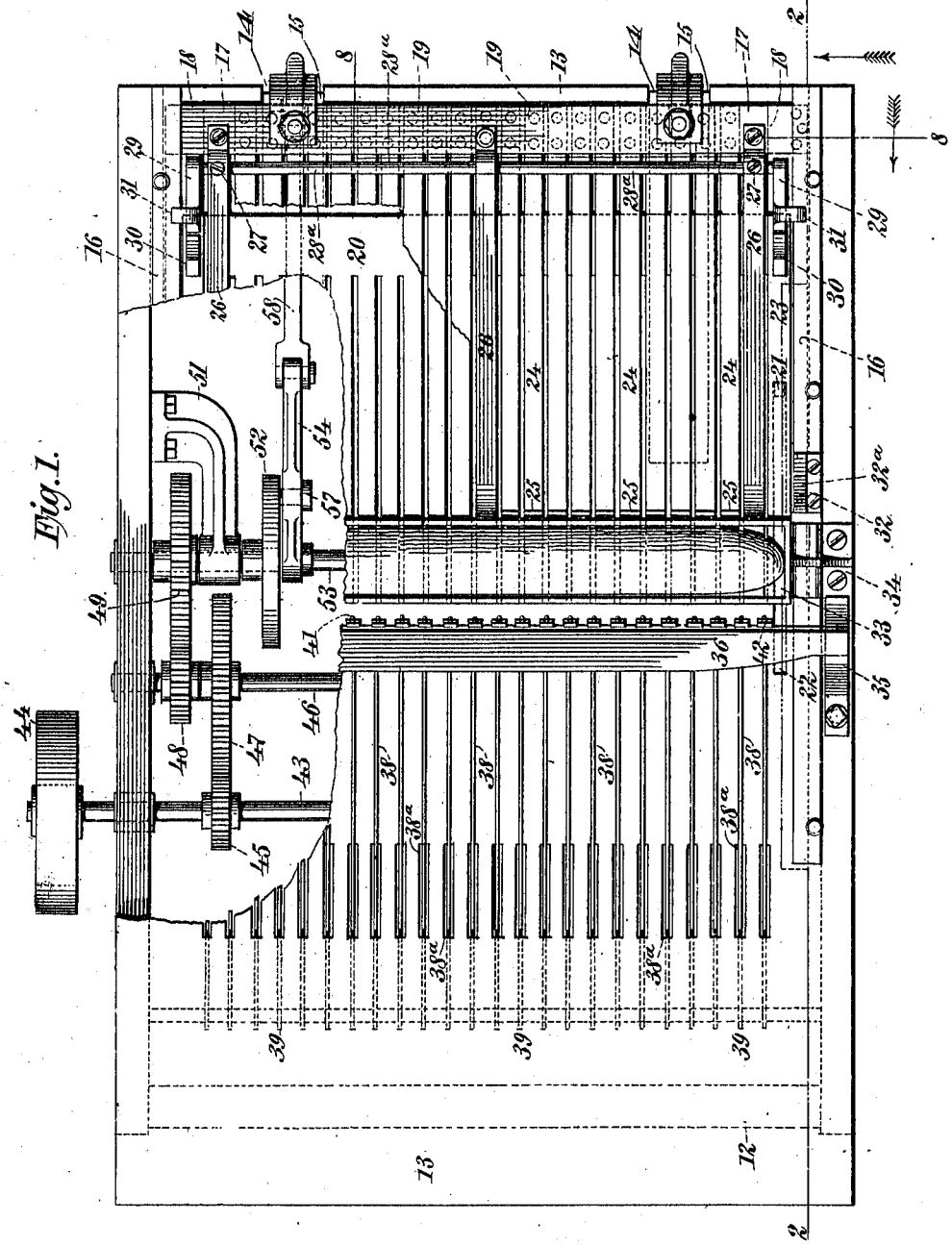
Figure 5:
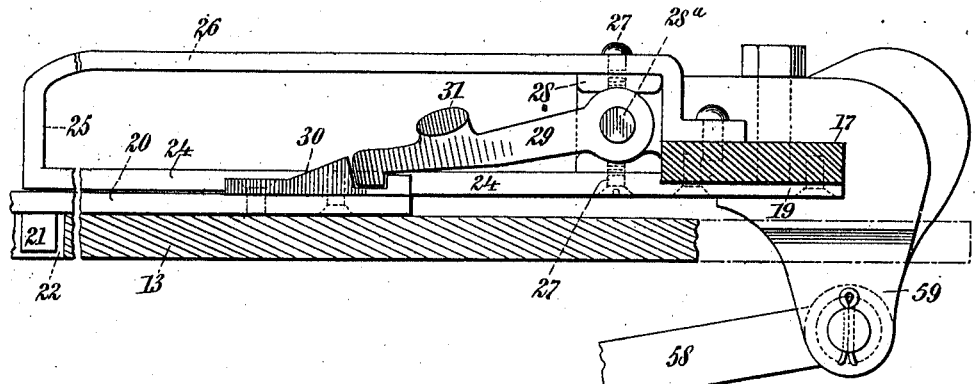
Figure 6:
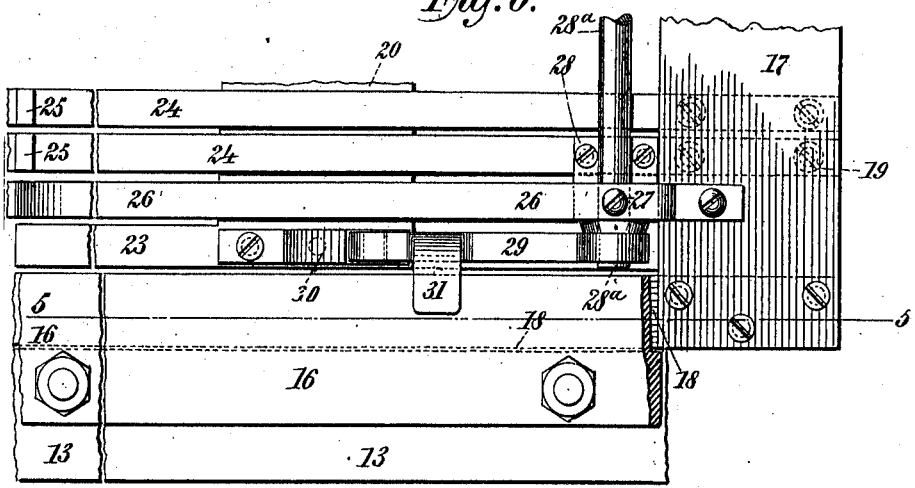
Figure 7:
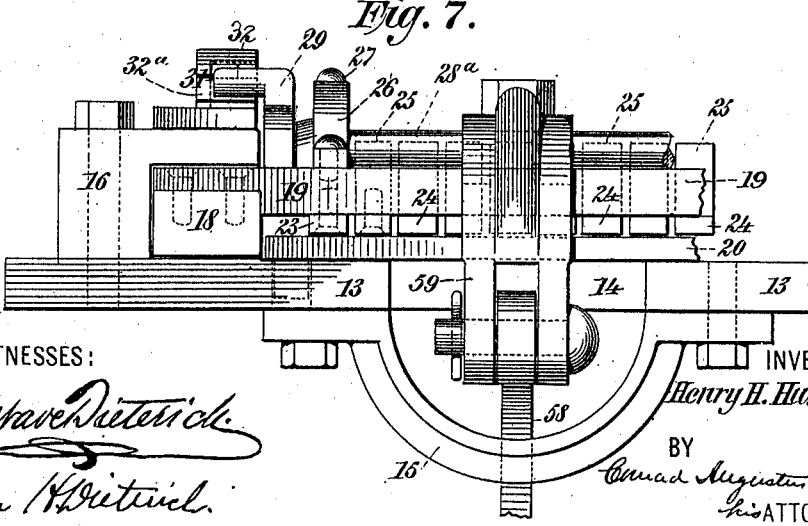

In the accompanying drawings forming part of this specification, wherein like numerals of reference indicate like parts, Figure 1 is a plan view, partly broken away, illustrating one form of a machine constructed according to and embodying my said invention; Fig. 2 is a section taken on the line 2—2 of Fig. 1, looking in the direction of the arrow; Fig. 3 is a detail perspective view showing a portion of the machine and the manner of supporting the magazine; Fig. 4 is a similar view partly in section showing the manner of supporting the loaves in the magazine, and the means for advancing the lowermost loaf; Fig. 5 is an enlarged detail section taken on the line 5—5 of Fig. 6, showing the means for advancing the loaves to the cutters, and then advancing the severed sections or slices beyond the cutters; Fig. 6 is an enlarged detail plan view showing the lower right hand corner of Fig. 1; Fig. 7 is an enlarged detail end view of the mechanism shown at Fig. 5, and Fig. 8 is an enlarged detail section taken on the line 8—8 of Fig. 1.

In said drawings 10 designates a table comprising the end frame-members 11, 11 secured together by means of transverse horizontal bars or stays 12, 12, and a top-plate 13 secured upon said frame-members 11 11. The front portion of said top-plate 13 (which is the right hand edge as viewed at Fig. 1) is provided with recesses 14, 14 adjacent to its opposite sides, which are bridged at their outer ends by means of semi-circular yokes 15, 15 bolted to the underside of the top-plate 13 at its front edge. Along the opposite longitudinal sides of the top-plate 13 are secured recessed guides 16, 16, within which works a U-shaped frame 17 consisting of side-members 18, 18 secured together at their outer or forward ends by a thinner transverse bar 19, as shown at Fig. 7.

Upon the table 13 between the side-members 18, 18 of the frame 17 is disposed a carrier or plate 20 having depending lugs or stops 21, 21 upon its under side adjacent to its opposite longitudinal edges which lugs or stops are adapted to extend into longitudinal slots 22, 22 provided in the table 13 whereby to limit the reciprocation of said plate 20. The inner end of the plate 20 is slitted to form a plurality of separated fingers or tines 23, 23 of uniform width and length. Above said fingers or tines 23 are disposed a series of pushers 24, 24 which correspond in width with said fingers and are secured at their forward ends to the underside of the transverse bar 19 of the frame 17, while their inner ends are arranged at right angles to the horizontal portions of said pushers to form upwardly projecting ends 25 25 adapted to contact with the side of a loaf of bread to be sliced. At certain intervals, for example, at the ends and at the center of the carrier or plate 20 the ends 25 of the pushers 24 are carried upward a short distance, and then forward and their upper ends secured by screws upon the upper surface of the transverse bar 19 to form supports 26 26 for the loaves in the magazine, as hereinafter described.

At the inner edge of the bar 19 between the forward ends of the outer pushers 24 and the upper supports 26 thereof are secured, by means of screws 27 27, blocks 28 28 in which is supported a transverse rod 28ᵃ having pivotally secured thereto at its opposite ends detents 29 29 adapted to engage recessed cam blocks 30 30 secured upon the plate 20 adjacent to its longitudinal edges. Each of said detents 29 is provided with a lateral projection 31 adapted to engage the hinged inclined face 32ᵃ of a cam 32 secured upon the guides 16 16 which serve to release said detents 29 29 of their engagement with the recessed blocks 30 30 on the plate 20 when said plate has about reached the limit of its inward movement, and permit of the free passage of said detents 29 during the outward movement of said plate 20.

Near the middle of the table 13 is arranged a magazine or receptacle for the loaves of bread comprising an oblong receptacle 33 open at its top and bottom, and so supported above the table 13 by means of brackets 34 34 as to permit of the pushers 24 and supports 26, 26 to pass thereunder, when the same are advanced. At the opposite side of the table 13 to the rear of the magazine 33 are secured brackets 35 35 to which is secured a channel bar 36, and upon the under side of said table 13 adjacent to its rear edge are provided a series of depending lugs 37.

38 38 denote inclined blades or cutters which pass through slots 38ᵃ in the table 13, and are secured at their lower ends intermediate the depending lugs 37 to a transverse rod 39 secured at its opposite ends to the end members 11 11 of the frame. The upper ends of said blades or cutters are pivotally secured to heads 40 disposed in the channel of the bar 36 having screws 41 extending through the upper forward side of said bar and provided with nuts 42 whereby to adjust the tension of said blades or cutters 38 38.

Supported in the frame members 11 11 below the table 13 is a transverse driving shaft 43 having a pulley 44 fixed thereon at one end outside of the frame, and a pinion 45 fixed upon said shaft between said frame members.

46 denotes a counter shaft supported at its ends in the frame members 11, 11 in front of the driving shaft 43, having a large gear wheel 47 fixed thereon meshing with the pinion 45 on the driving shaft 43. Adjacent to the ends of the counter shaft 46 and inside of the frame members 11 11 are fixed pinions 48 48 meshing with large gear wheels 49 49 fixed upon short shafts 50, 50 supported partly in said frame members 11 11, and partly in brackets 51 51 secured upon the inner sides of said frame members, and upon the inner ends of said short shafts 50, 50 are fixed disks 52, 52.

At the bottom of the frame members 11 11 directly below the short shafts 50 50 is supported a transverse shaft 53 upon which are pivotally secured the lower ends of levers 54 54 provided with slots 55 55 in which work blocks 56 56 mounted on crank pins 57 57 secured to the disks 52 52.

58 58 denote links which are pivotally secured at their inner ends to the upper ends of the levers 54 54 and at their forward ends to depending brackets or supports 59 59 secured to the front edge of the bar 19 of the frame 17.

The operation of the machine is as follows: As soon as power is applied to the pulley 44 the disks 52 52 will be caused to rotate and move the upper ends of the levers 54 54 and the links 58 58 inward together with the frame 17 secured to said links. As the frame 17 moves inward the ends of the detents 29 29 being in engagement with the recessed blocks 30 30 on the carrier or plate 20 will cause said carrier or plate 20 to be carried therewith, and convey the loaf received at the inner end of said plate as it passes under the magazine 33, to and below the inclined blades or cutters 38 38, and as the loaf is forced against the lower edge of said blades or cutters 38 38 by the pushers 24 24 the entire loaf will be simultaneously severed into sections of uniform width. As soon as the stops 21 21 upon the under side of the carrier or plate 20 contact with the inner ends of the slots 22 22 in the table 13 the further inward movement of said plate 20 will be arrested. At about the same moment that the stops 21 21 contact with the inner ends of the slots 22 22 the projections 31 31 of the detents 29 29 will ride up upon the cams 32 32 and release the detents 29 29 of their engagement with the recessed blocks 30 30 on the carrier or plate 20 and thereby break the connection between the sliding frame 17 and said carrier or plate 20 and thus permit the said frame 17 and the pushers 24 24 to continue their inward movement and strip the severed sections or slices of bread from the inner end of the carrier or plate 20, and through the blades or cutters 38 38, and deposit the same upon the table 13 at a point substantially above the depending lugs 37 37. It will be observed that while one loaf is being acted upon by the pushers 24 24 and conveyed toward the blades or cutters 38 38, those remaining in the magazine 33 will be supported in position therein by the supports 26 26 provided upon certain of the pushers 24 24. As soon as the loaf has been severed into sections or slices the frame 17 and pushers 24 24 will be returned to their initial positions, and the detents 29 29 in the course of said return movement will again engage the recessed blades 30 30 and carry the plate outward again, and as soon as the ends of the pushers 24 24 have cleared the bottom of the magazine 33 a new loaf will be deposited upon the inner end of the plate 20, in position to be acted upon during the following inward movement of the machine, and so on.

It is to be observed that owing to the arrangement of the levers 54 54 and the cranks 57 57 the frame 17 and the carrier or plate 20 will be moved inward with a slower movement, and outward with a more rapid movement.

Having thus described my invention, what I claim and desire to secure by Letters Patent is:

1. In a machine of the character described, the combination with a support, of a holder for the material to be cut, cutting means for severing said material into sections or slices, means for supporting and conveying said material up to said cutting means, and means for removing said material from said supporting and conveying means and moving through said cutting means whereby to sever the same into sections or slices, substantially as specified.

2. In a machine of the character described, the combination with a support, of a holder for the loaves arranged thereon, a series of knives for severing a loaf into a plurality of sections or slices, means for supporting and conveying said loaf into engagement with said knives, means for arresting the movement of said conveying means after said loaf has been severed into sections or slices and means for advancing said severed sections or slices individually between said knives and removing the same from said supporting and conveying means to said support at a point to the rear of said cutting means, substantially as specified.

3. In a machine of the character described, the combination with a support, of a holder for the loaves arranged thereon, a series of knives for severing a loaf into a plurality of sections or slices, a reciprocating carrier for conveying said loaf into engagement with said knives, means for arresting the movement of said carrier as said loaf is about to be engaged by said knives, and means coöperating with said carrier for advancing said severed sections or slices between said knives and removing the same from said carrier, after its movement has been arrested, to said support, substantially as specified.

4. In a machine of the character described, the combination with a support, of a holder for the loaves arranged thereon, a series of knives for severing a loaf into a plurality of sections or slices, a reciprocating carrier for conveying said loaf into engagement with said knives, means for arresting the movement of said carrier at a point in advance of said knives, a reciprocating member coöperating with said carrier for advancing said severed sections or slices between said knives and removing the same from said carrier to said support, and means for reciprocating said carrier and coöperating member, substantially as specified.

5. In a machine of the character described, the combination with a stationary support, of a holder for the loaves arranged thereon, a series of inclined knives upon said support for severing the loaves into a plurality of sections or slices, a reciprocating carrier for conveying said loaves into engagement with said knives, means arranged upon said carrier for arresting the movement thereof, means arranged upon said carrier adapted to be operatively connected thereto, and coöperating therewith for advancing said severed sections or slices between said knives and removing the same from said carrier to said support, substantially as specified.

6. In a machine of the character described, the combination with a stationary support, of a holder for the loaves arranged thereon, a series of inclined knives arranged upon said support, a reciprocating carrier upon said support, a frame arranged above said carrier, a series of pushers secured thereto, and means for jointly moving said carrier and frame for a part of the way, and said frame and pushers only for the remainder of the way, substantially as specified.

7. In a machine of the character described, the combination with a stationary support, of a holder for the loaves arranged thereon, a series of inclined knives arranged upon said support, a reciprocating carrier supported upon said support, a frame arranged above said carrier having a plurality of pushers secured thereon, means for locking said carrier and frame together, and means for releasing said carrier of its engagement with said frame near the end of the inward movement of said frame and pushers, substantially as specified.

8. In a machine of the character described, the combination with a stationary support, of a holder for the loaves arranged thereon, a series of inclined knives arranged upon said support, a reciprocating carrier having its inner edge slitted and adapted to pass between said knives, a frame guided above said carrier, means for limiting the movement of said carrier arranged upon the under side thereof, means for locking said carrier and frame in operative relation, means for releasing said carrier from said frame near the limit of its movement, and means for reciprocating said carrier and frame, substantially as specified.

9. In a machine of the character described, the combination with a stationary support, of a holder for the loaves arranged thereon, a series of inclined knives arranged upon said support, a reciprocating carrier having its inner edge slitted and adapted to pass between said knives, a frame arranged in guides above said carrier, locking means arranged on said carrier and frame for locking the same in operative relation, means for reciprocating said carrier and frame, and means for releasing said locking means near the end of the inward movement of said carrier and frame, substantially as specified.

10. In a machine of the character described, the combination with a stationary support, of a holder for the loaves secured thereon, a series of inclined knives, a reciprocating plate having its inner edge slitted and adapted to pass partly between said knives, guides arranged at the sides of said plate, a frame arranged to work in said guides, a plurality of pushers and supports for the loaves secured to said frame, engageable devices secured upon said plate, detents carried by said frame, and cam means arranged upon said stationary support for releasing said detents near the end of the inward movement of said reciprocating plate, substantially as specified.

11. In a machine of the character described, the combination with a stationary support, a series of inclined knives extending through said support and having their ends secured above and below the same, a holder for the loaves secured transversely of said support, a reciprocating plate having its inner edge slitted and adapted to pass partly between said knives, guides secured upon said support to the sides of said plate, a frame arranged to work in said guides, a plurality of inwardly extending pushers and bread supports secured to said frame, catches on said plate, detents carried by said frame adapted to engage said catches, lugs on said detents, and cam means arranged upon said support adapted to engage the lugs on said detents whereby to release said detents near the end of the inward movement of said plate, substantially as specified.

12. In a machine of the character described, the combination with a stationary support, a series of inclined knives extending through said support and having their ends secured above and below the same, a holder for the loaves secured transversely of said support, a reciprocating plate having its inner edge slitted and adapted to pass partly between said knives, guides secured upon said support to the sides of said plate, a frame arranged to work in said guides, a plurality of inwardly extending pushers and bread supports secured to said frame, catches on said plate, detents carried by said frame adapted to engage said catches, lugs on said detents, cam means arranged upon said support adapted to engage the lugs on said detents whereby to release said detents near the end of the inward movement of said plate, and means for reciprocating said plate and frame, substantially as specified.

Signed at the city of New York, in the county and State of New York, this twenty-fourth day of May, nineteen hundred and six.

HENRY H. HUNGERFORD.

Witnesses:
CONRAD A. DIETERICH,
FRANCIS V. ROEPKEN.